United States Patent
Itoh

(10) Patent No.: US 6,622,918 B2
(45) Date of Patent: Sep. 23, 2003

(54) BARCODE READING APPARATUS AND BARCODE READING METHOD

(75) Inventor: Motohiko Itoh, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/200,130

(22) Filed: Jul. 23, 2002

(65) Prior Publication Data

US 2002/0175209 A1 Nov. 28, 2002

Related U.S. Application Data

(63) Continuation of application No. PCT/JP00/01035, filed on Feb. 23, 2000.

(51) Int. Cl.[7] .................................................. G06K 7/10
(52) U.S. Cl. .............................. 235/462.25; 235/462.01
(58) Field of Search ..................... 235/462.01, 462.12, 235/462.25

(56) References Cited

U.S. PATENT DOCUMENTS 5,393,968 A * 2/1995 Watanabe et al. ...... 235/462.29
5,959,282 A * 9/1999 Tabuchi ................. 235/462.01
6,474,555 B1 * 11/2002 Tsunobuchi et al. ... 235/462.01

FOREIGN PATENT DOCUMENTS

| JP | 57-148243 | 9/1982 |
| JP | 5-108862 | 4/1993 |
| JP | 5-508505 | 11/1993 |

* cited by examiner

Primary Examiner—Thien M. Le
Assistant Examiner—April Nowlin
(74) Attorney, Agent, or Firm—Arent Fox Kintner Plotkin & Kahn

(57) ABSTRACT

A barcode reading apparatus including a barcode reader (10) for reading a barcode; a reading incorrectness discriminating section (20) for discriminating whether or not the result of the reading of the barcode by the barcode reading section (10) is likely to be incorrect and a re-read indicating section (30) for indicating, if the result of the reading of the barcode is discriminated likely to be incorrect by the reading incorrectness discriminating section (20), that it is necessary to re-read the bar code by the barcode reader (10) so that a result of incorrectly reading of a barcode is prevented from being used in a POS (Point Of Sales) system or the like for the purpose of improving the reliability of results of reading of barcodes.

12 Claims, 5 Drawing Sheets

BARCODE READING APPARATUS AND BARCODE READING METHOD

This application is a continuation of International Application No. PCT/JP00/01035, filed Feb. 23, 2000.

TECHNICAL FIELD

The present invention relates to an apparatus and a method for reading a barcode using a barcode reader, and particularly relates to a barcode reading apparatus and method preferably incorporated into a POS (Point Of Sales) system.

BACKGROUND OF THE INVENTION

At the present time, barcodes are used for various purposes; for example, a POS system used in a supermarket or the like reads barcodes printed on a commodity with a barcode reading apparatus to perform various processes based on information contained in the result of the reading for the barcodes.

A barcode reading apparatus that is known to the art reads a barcode by irradiating the barcode with light from a semiconductor laser and then reading light reflected by the barcode with a photo-diode, or reads a barcode with a CCD camera.

If a conventional barcode reading apparatus that is known to the art incorrectly reads a barcode of poor printing quality on a label or the like, the apparatus automatically re-reads (reads one more time) the same barcode when the operator performs an additional reading using the barcode reader.

Another way to surely avoid incorrect barcode reading is when a barcode reading apparatus reads the same barcode several times during one pass by the operator with a barcode reader or the like, and information obtained thereby is used for a further process only when the results of the plural readings are identical.

However, even if such a conventional barcode reading apparatus re-reads (re-scans) a barcode during one pass by the operator, the barcode is scanned several times in the same state. In other words, since the barcode is re-read in the same state (e.g., the posture of a barcode in relation to the barcode reader of the barcode reading apparatus) as that of the previous reading when the barcode was incorrectly read, the result of the re-reading tends to be incorrect and there is still a strong possibility of incorrect reading of barcodes.

Further, since a conventional barcode reading apparatus automatically re-reads a barcode when the barcode has been incorrectly read, the operator rarely becomes aware that barcode reading is likely to be incorrect. Accordingly, there is a possibility that an operator may proceed with arrangements for payment without recognizing that the reading is likely to be incorrect, resulting in a considerable adverse effect on the customers and the store.

Considering the foregoing problems, it is an object of the present invention to provide a barcode reading method and apparatus that are able to enhance the reliability of the results of reading of barcodes by surely preventing, with certainty, incorrect barcode reading results from being used.

DISCLOSURE OF THE INVENTION

To attain the above object, as a first generic feature, there is provided a barcode reading apparatus comprising: a barcode reader for reading a barcode; a reading incorrectness discriminating section for discriminating whether or not the result of the reading of the barcode by the barcode reading section is likely to be incorrect; and a re-read indicating section for indicating, if the result of the reading of the barcode is discriminated likely to be incorrect by the reading incorrectness discriminating section, that it is necessary to re-read the bar code by the barcode reader.

Also to accomplish the above object, as a second generic feature, there is provided a barcode reading method comprising the steps of: reading a barcode; discriminating whether or not the result of the reading of the barcode is likely to be incorrect; and if the result of the reading is discriminated likely to be incorrect, indicating that it is necessary to re-read the barcode.

With this method and apparatus, since a barcode whose result of reading is discriminated likely to be incorrect is re-read, the re-reading of the barcode can be carried out in a different state (e.g., with a different barcode posture of a barcode in relation to the barcode reader) from that of the reading whereupon the result of reading of a barcode by the barcode reader which result is discriminated likely to be incorrect is prevented from being used. Partly since an operator of the barcode reading apparatus can recognize that the result of the barcode is likely to be incorrect and partly since the operator is able to discriminate whether or not the result of reading of a barcode is likely to be correct visually or by other means, it is possible to advantageously boost the reliability of the results of reading of barcodes.

As a preferable feature, a barcode reading apparatus may further comprise a storing section for storing, if the result of the reading of the barcode is discriminated likely to be incorrect by the reading incorrectness discriminating section, the result of the reading of the barcode therein; a comparing section for comparing the result of the re-reading of the barcode by the barcode reader in response to the indicating by the re-read indicating section with the result of the reading stored in the storing section to discriminate whether or not the results of the reading and the re-reading are identical; a processing section for determining, if the result of the reading and the re-reading are discriminated not to be identical by the comparing section, the reading of the barcode has failed to treat the result of the reading accordingly.

As another preferable feature, a barcode reading method may further comprise the steps of: if the result of the reading is discriminated likely to be incorrect, storing the result of the reading of the barcode in a storing section; re-reading the barcode in response to the indicating in the step of indicating; comparing the result of the re-reading of the barcode with the result of the reading of the barcode stored in the storing section to discriminate whether or not the results of the re-reading and the reading are identical; and if the results of the re-reading and the reading are discriminated not to be identical, determining the reading of the barcode has failed to treat the result of the reading accordingly.

This apparatus and method enables an operator to grasp that reading of a barcode has failed thereby improving the reliability of results of bar code reading.

As still another preferable feature, if the results of the reading and re-reading are discriminated to be identical by the comparing section, the processing section may determine the reading of the barcode has succeeded to treat the result of the reading accordingly, and a barcode reading method may further comprise the steps of if the result of the re-reading and the reading are discriminated to be identical, determining the reading of the barcode has succeeded and treating the result of the reading accordingly.

As a result, it is possible to determine that the result of reading has been successful with ease whereupon the reliability of the results of barcodes reading is enhanced.

As an additional feature, the re-read indicating section may be operable to repeatedly perform the indicating such that the barcode reader repeatedly re-reads the barcode until the result of the reading and the result of the last re-reading are continuously discriminated to be identical a predetermined number of times; and if the results of the reading and the last re-reading are continuously discriminated to be identical the predetermined number of times by the comparing section, the processing section may determine the reading of the barcode has succeeded to treat the result of the reading accordingly.

As a further preferable feature, a barcode reading method may further comprise the steps of: repeatedly performing the step of indicating, the step of re-reading, and the step of comparing until the results of the last re-reading and the reading are continuously discriminated to be identical a predetermined number of times; if the results of the last re-reading and the reading are continuously discriminated to be identical the predetermined number of times, determining the reading of the barcode has succeeded to treat the result of the reading accordingly.

Since reading of a barcode is discriminated to have succeeded only when the results of the last re-reading and the reading continuously discriminated to be identical the predetermined number of times, it is possible to apply a higher criterion to discriminate whether or not the result of reading of a barcode is likely to be incorrect with further improved reliability.

On the other hand, if the results of the reading and the last re-reading are judged not to be identical prior to being continuously discriminated to be identical the predetermined number of times, the processing section may determine that the reading of the barcode has failed to treat the result of the reading accordingly. It is therefore possible to improve the reliability of determination of whether or not reading of a barcode has succeeded.

As a further preferable feature, a barcode reading apparatus may further comprise a discriminating result indicating section for indicating the result of the each discriminating performed by the comparing section. With this discriminating result indicating section, an operator of the barcode reading apparatus can grasp the result of the discriminating thereby being able to take appropriate actions, considering whether or not reading of a barcode has succeeded. It is further possible to improve the reliability of results of reading of barcodes.

As a further preferable feature, if a result of decoding in a predetermined direction of scanning with respect to the result of reading of the barcode by the barcode reader is incorrect while a result of decoding in the reverse direction of the predetermined direction is correct, the reading incorrectness discriminating section may discriminate that the result of the reading is likely to be incorrect. As a further preferable feature, the step of discriminating for reading correctness may include the step of: if a result of decoding in a predetermined direction of scanning with respect to the result of the reading of the barcode is incorrect while a result of decoding in the reverse direction of the predetermined direction is correct, discriminating the reading is likely to be incorrect.

An a further preferable feature, the reading incorrectness discriminating section may compare the result of the reading of the barcode by the barcode reader with a barcode composition requirement previously established to determine whether or not the result of the reading suffices the barcode composition requirement and, if the result of the reading is discriminated not to suffice the barcode composition requirement, reading incorrectness discriminating section may discriminate the result of the reading is likely to be incorrect.

As a further preferable feature, if an amount of a distortion of reading obtained from the result of the reading of the barcode by the barcode reader is outside a predetermined range of a distortion of reading while a result of decoding with respect to the result of the reading of the barcode is correct, the reading incorrectness discriminating section may discriminate the result of the reading is likely to be incorrect.

With the foregoing feature, it is possible to accurately judge whether or not the result of reading of a barcode is likely to be incorrect with ease.

BEST MODE FOR CARRYING OUT THE INVENTION

Various embodiments of the present invention will now be described with reference to the accompanying drawings.

(A) First Embodiment

Figure 1:
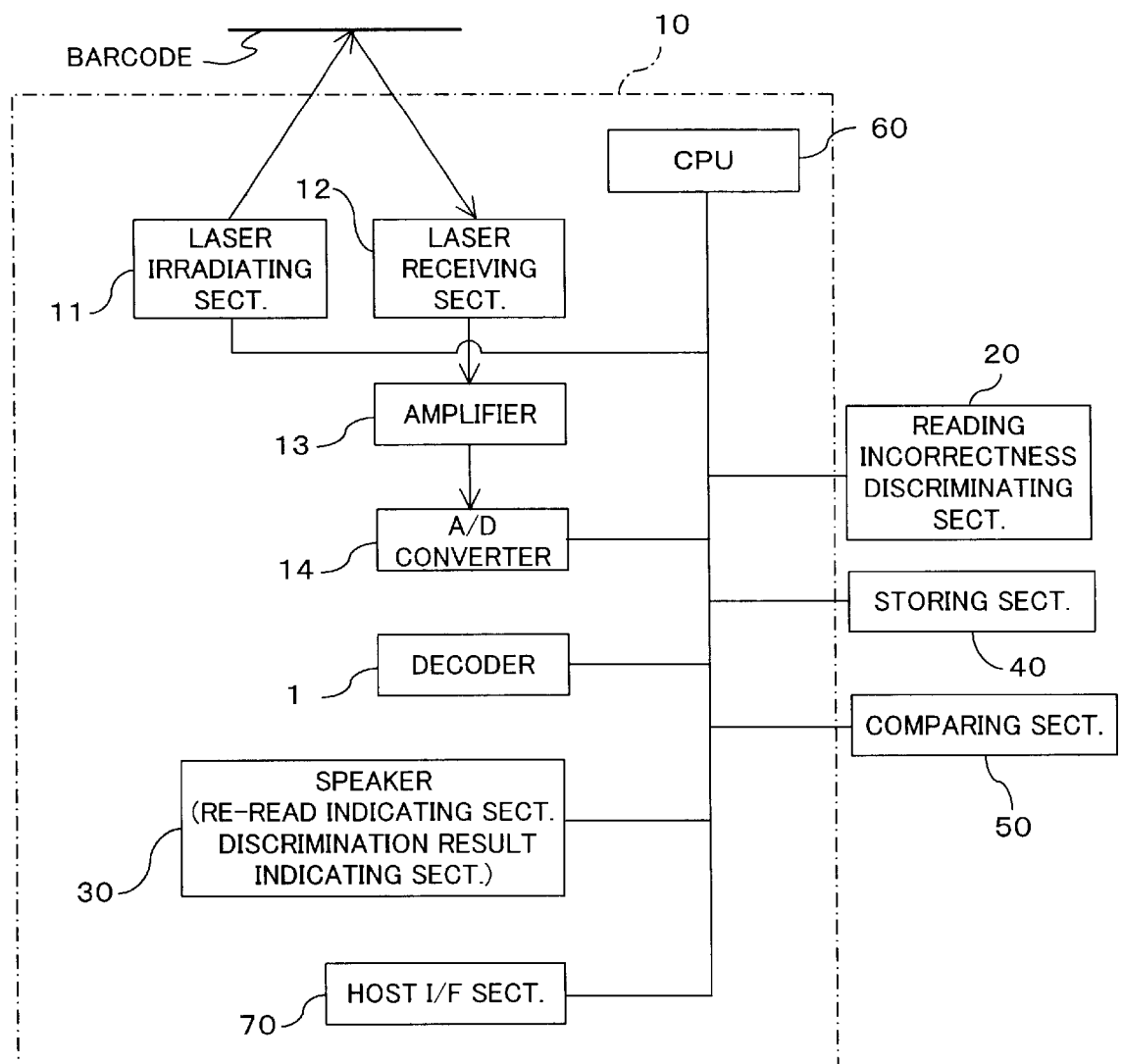
FIG. 1 is a block diagram schematically showing a barcode reading apparatus according to a first embodiment of the present invention.

FIG. 1 is a block diagram schematically showing a barcode reading apparatus according to the first embodiment of the present invention. As shown in FIG. 1, the barcode reading apparatus of the first embodiment comprises barcode reader (barcode reading section) 10, reading incorrectness discriminating section 20, storing section 40 and comparing section 50.

A barcode is generally formed by a plurality of bars of black color (hereinafter called black bars) and a plurality of bars of white color (hereinafter called white bars), black bars and white bars being alternately arranged, and represents peculiar data based on the width of each of the black and white bars. The barcode reading apparatus of the first embodiment reads data represented by such a barcode.

A barcode of poor printing quality occasionally has a wide bar (hereinafter called a thick bar) and a narrow bar (hereinafter called a thin bar) the ratio of the widths of which is less than a predetermined value. In this case, it is hard to discriminate a thick bar from a thin bar whereupon there is a possibility of erroneous reading of a barcode of poor quality.

Generally, in relation to widths of thick and thin bars, for example, a discrete barcode, exemplified by CODE 39 or CORDABAR, requires a thick bar and a thin bar thereof to have a ratio of widths of the thick bar to the thin bar (i.e., a ratio (thick bar width)/(thin bar width)) to be equal to or greater than a predetermined standard value (e.g., 2.2).

The illustrated embodiment utilizes a barcode reader 10 which irradiates a barcode having the above-mentioned composition with laser beams so as to read the barcode. Hereinafter, the present invention is assumed to be applied to a barcode reading apparatus equipped with barcode reader 10 that irradiates a target barcode with laser beams.

Barcode reader 10 is handled by an operator in order to read a barcode by scanning, and as shown in FIG. 1 includes laser irradiating section 11, laser receiving section 12, amplifier 13, A/D (analog/digital) converter 14, decoder 15, speaker (a re-read indicating section, a discrimination result indicating section) 30, CPU (a processing section) 60, and host interface section (a host I/F section) 70.

Laser irradiating section 11 sends out laser beams, and the laser beams from laser irradiating section 11 are reflected through a non-illustrated scanning mechanism whereupon the laser beams reach the plural black and white bars composing a barcode. The laser beams travel at a constant speed on the barcode in a direction that the plural black and white bars are alternately arranged to scan the bar code.

Laser receiving section 12 receives light beams (reflected light beams) that are the consequence of reflection of the laser beams, which have been sent out from laser irradiating section 11, on the surface of the barcode. Upon receipt of the reflected light beams, laser receiving section 12 converts the reflected light beams received to an electric signal (analog values) in accordance with the amount of received reflected light beams. Laser receiving section 12 is exemplified by one or more photo-diodes.

Amplifier 13 amplifies the electric signal converted by laser receiving section 12, and A/D converter 14 digitizes the electric signal amplified by amplifier 13 so as to convert the electric signal (analog values) to a binary-digit signal having a black level signal and a white level signal corresponding to each black bar and each white bar composing the barcode, respectively.

Decoder 15 decodes the binary-digit signal converted by A/D converter 14 to convert the signal to data of a value, which is measured by counting clock signals, which is generated by a non-illustrated clock generator, corresponding to time slots for each part of the black level signal and the white level signal (that represent widths of the black bars and the white bars of a barcode, respectively) included in the binary-digit signal from A/D converter 14. Further, decoder 15 performs a predetermined decoding operation on the count of the clock signals thereby decoding and extracting data peculiar to the barcode.

Reading of a target barcode is executed by an operator's movement of the target barcode towards laser irradiating section 11 and laser receiving section 12 of barcode reader 10.

Speaker 30 beeps an arbitrary number of times at various frequencies (e.g., 600 Hz, in this example, one frequency). Control by reading incorrectness discriminating section 20 and/or CPU 60 that are described later makes speaker 30 beep for a predetermined length of time at predetermined intervals.

More specifically, speaker 30 beeps twice consecutively at 600 HZ when reading incorrectness discriminating section 20 judges that a result of reading of a barcode is likely to be incorrect. For this reason, speaker 30 serves to function as a retread indicating section that indicates to the operator that it is necessary to re-read a barcode with barcode reader 10 when reading incorrectness discriminating section 20 has judged that the result of reading of the barcode is likely to be incorrect.

Speaker 30 additionally beeps once at 600 HZ as reading incorrectness discriminating section 20 judges that a result of reading a barcode is likely to be correct.

Further, speaker 30 beeps once at 600 HZ also when comparing section 50 described later judges that two results of reading for one and the same barcode are identical. On the contrary, when comparing section 50 discriminates that such two results are not identical, speaker 30 beeps three consecutive times at 600 HZ. Speaker 30 serves therefore to function as a discriminating result indicating section that indicates a result of discrimination performed by comparing section 50 to the operator.

CPU 60 controls overall operations performed by each of barcode reader 10, reading incorrectness discriminating section 20, speaker 30, storing section 40, comparing section 50, and host I/F section 70.

When comparing section 50 judges that two results of reading for one and the same barcode are not identical, CPU 60 determines that the reading of the barcode has failed and treats the result of the reading accordingly. On the other hand, when the results are judged to be identical, CPU 60 determines that the reading has succeeded and treats the result accordingly.

Host I/F section 70 is connected to a non-illustrated host computer or the like and sends the host computer the result of a successful reading of a barcode or other data.

Figure 2:
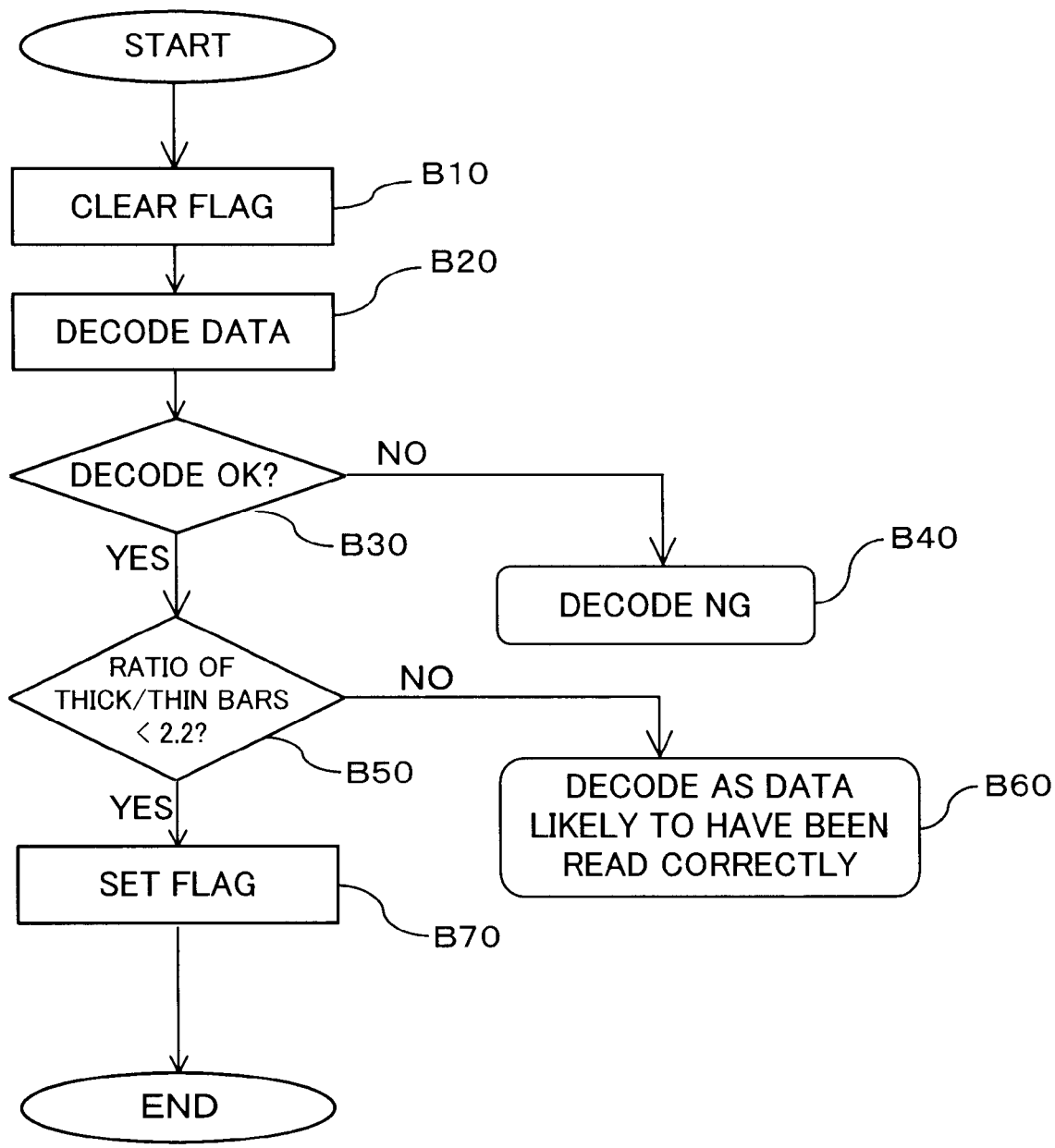
FIG. 2 is a flow diagram illustrating an example of a method for discriminating whether or not the result of reading of a barcode is likely to be incorrect.
Figure 3:
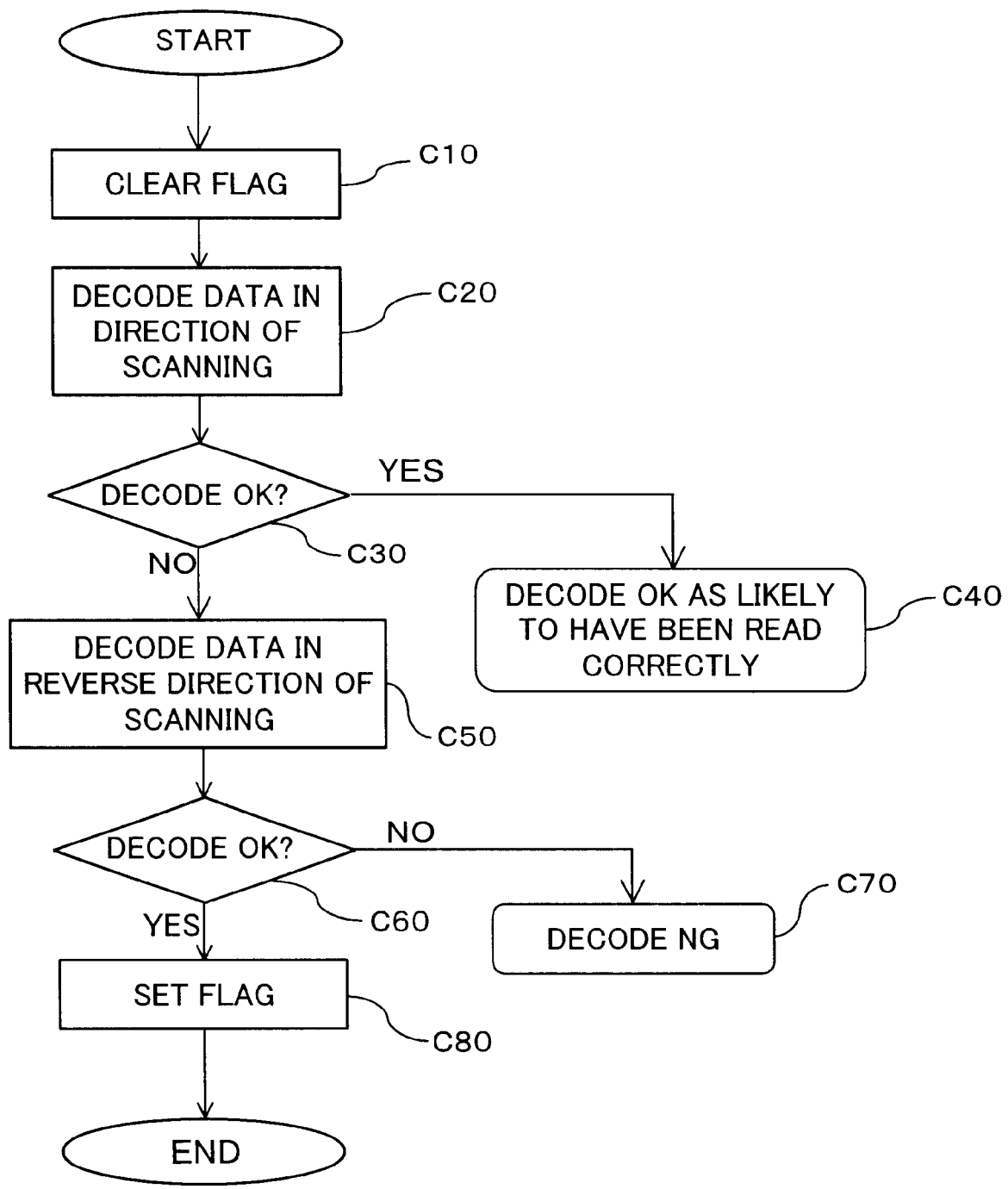
FIG. 3 is a flow diagram illustrating another example of a method for discriminating whether or not the result of reading of a barcode is likely to be incorrect.

Reading incorrectness discriminating section 20 discriminates whether or not a result of reading of a barcode is likely to be incorrect, and performs the discrimination by execution of procedural steps as shown in FIG. 2 or 3.

FIGS. 2 and 3 are flow diagrams, each showing an example of a method for discriminating whether or not the result of reading of a barcode is likely to be incorrect. Reading incorrectness discriminating section 20 discriminates whether or not the result of reading of a barcode is likely to be incorrect in the manner disclosed in either FIG. 2 or 3.

At first, a method for discriminating whether or not a result of reading of a barcode is likely to be incorrect is described with reference to a flow diagram FIG. 2 showing procedural steps (Steps B10 to B70), which are efficiently applied to reading a discrete barcode, such as CODE 39 or CODABAR.

First of all, reading incorrectness discriminating section 20 clears a flag off storing section 40 later described (Step B10), which flag is to be set when the result of reading of a barcode is likely to be incorrect, and then causes decoder 15 to decode the result of reading a barcode (Step B20), which reading has been performed by the operator using barcode reader 10.

After that, reading incorrectness discriminating section 20 discriminates whether or not the decoding by decoder 15 has been successful (Step B30). If the decoding is judged to be a failure for some reason (No route in Step B30), reading incorrectness discriminating section 20 makes speaker 30 beep to indicate to the operator that the reading of the barcode has failed (Step B40).

On the contrary, if the decoding is judged to be successful (Yes route in Step B30), reading incorrectness discriminating section 20 further judges whether or not the result of the reading of the barcode includes a combination of a thick bar and a thin bar whose ratio of the widths is less than 2.2 (Step B50) If the result of the reading of the barcode does not include the combination of thick and thin bars whose ratio of widths is less than 2.2 (No route in Step B50), the result of the reading of the barcode is discriminated likely to be correct (Step B60).

Conversely, if the result of the reading of the barcode includes the combination of thick and thin bars whose ratio is less than 2.2 (Yes route in Step B50), reading incorrectness discriminating section 20 judges that the result of the reading of the barcode is likely to be incorrect and sets a flag indicating the fact (Step B70).

In other words, if an amount of a distortion of reading obtained from the result of the reading for the barcode (in the illustrated embodiment, a ratio of the widths of a thick bar and a thin bar) is outside a predetermined range of a distortion of reading (in the illustrated embodiment, less than 2.2) while a result of decoding of the result of the reading for the same barcode by barcode reader 10 is correct, reading incorrectness discriminating section 20 discriminates that the result of the reading is likely to be incorrect; that is, reading incorrectness discriminating section 20 discriminates whether is likely to be incorrect by discriminating whether or not the barcode read has a composition problem.

Namely, reading incorrectness discriminating section 20 compares a result of reading of a barcode with requirement previously established for reading incorrectness discrimination (e.g., an amount of distortion of reading (in the illustrated embodiment, a ratio of the widths of thick and thin bars) being within a predetermined range; a barcode composition requirement (condition)) so that the result of the reading of the barcode is judged to fulfill the barcode composition requirement. If the result of reading for a barcode does not fulfill the barcode composition requirement, i.e., an amount of a distortion of the reading is outside the range of the predetermined amount (in the illustrated embodiment, less than 2.2), the result of reading is discriminated likely to be incorrect.

The ratio of the widths of thick and thin bars should by no means be limited to 2.2 and may be an amount other than 2.2. As an alternative, a result of reading may be discriminated likely to be incorrect or not based on discrimination of whether or not the ratio of the widths of thick and thin bars is within a predetermined range (e.g., from 2.2 to 3.0) and other alternatives may be suggested without departing from the concept of the present invention.

In the illustrated example, the barcode composition requirement is defined by an amount of a distortion of reading for a barcode, however should by no means be limited to the example. An appropriate alternative may of course be suggested.

In the illustrated example, a ratio of the widths of thick and thin bars is used as an amount of a distortion, which should by no means be limited to the ratio. As an alternative, an amount of a distortion may be the width of a thick or thin bar, or the distance between thick and thin bars in order to discriminate reading incorrectness.

Individual standards define assorted compositions for barcodes, which compositions are different from each other, whereupon each standard has different peculiar requirement for discriminating whether or not a result of reading is likely to be incorrect. Therefore, requirement for a discrimination whether or not a result of reading is likely to be incorrect are previously established for each of various standards so that the barcode reading apparatus of the present invention can read and treat barcodes of the various standards.

Another method to discriminate whether or not a result of reading for a barcode is likely to be incorrect will be described with reference to a succession of procedural steps (Steps C10 to C80) in flow diagram FIG. 8. First of all, reading incorrectness discriminating section 20 clears a flag off storing section 40 (Step C10), which flag is to be set when a result of reading of a barcode is likely to be incorrect. A digital signal, which is a result of conversion performed by A/D converter 14 with respect to a barcode read by an operator using barcode reader 10, is decoded in the direction of predetermined scanning (e.g., in the direction of scanning the barcode) by decoder 15 (Step C20).

Reading incorrectness discriminating section 20 judges whether or not the decoder 15 has successfully decoded the digital data (Step C30). If the decoding by decoder 15 is discriminated to have succeeded (Yes route in Step C30), reading incorrectness discriminating section 20 determines that the result of the reading of the barcode is likely to be correct (Step C40).

On the other hand, if the decoding is judged to have failed for some reason (No route in Step C30), decoder 15 further decodes the digital data converted by A/D converter 14 in the reverse direction of the scanning direction (Step C50), and then judges whether or not the decoding has succeeded (Step C60).

If the decoding in the reverse direction has also failed (No route in Step C60), speaker 30 beeps so as to notify the operator that the reading of the barcode has failed (Step C70).

Conversely, when decoder 15 has succeeded in the decoding of the barcode in the reverse direction (Yes route in Step C60), reading incorrectness discriminating section 20 discriminates that the result of the reading for the barcode is likely to be incorrect and sets a flag indicating the fact (Step C80).

Namely, if the result of decoding in a predetermined direction of scanning (in the scanning direction) with respect to a result of reading of a barcode by barcode reader 10 is incorrect while the result of decoding in the reverse direction of the scanning direction is correct, reading incorrectness discriminating section 20 discriminates that the result of the barcode reading is likely to be incorrect.

Storing section 40 takes the form of a memory exemplified by RAM (Random Access Memory) or ROM (Read Only Memory), and retains a result of reading of a barcode, which result is discriminated likely to be incorrect by reading incorrectness discriminating section 20, that is, stores therein data of a value for the read barcode, which has been decoded by decoder 15.

A flag that is to be set as reading incorrectness discriminating section 20 discriminates that a result of reading of a barcode is likely to be incorrect is set in storing section 40.

Comparing section 50 compares a result of reading of a barcode, which result is stored in storing section 40, with a result of re-reading of the same barcode by barcode reader 10 in response to an indication through speaker 30, which will be described later, so that the results of the reading and the re-reading are judged to be identical or not. The comparison and the discrimination are executed by CPU 60.

Figure 4A:
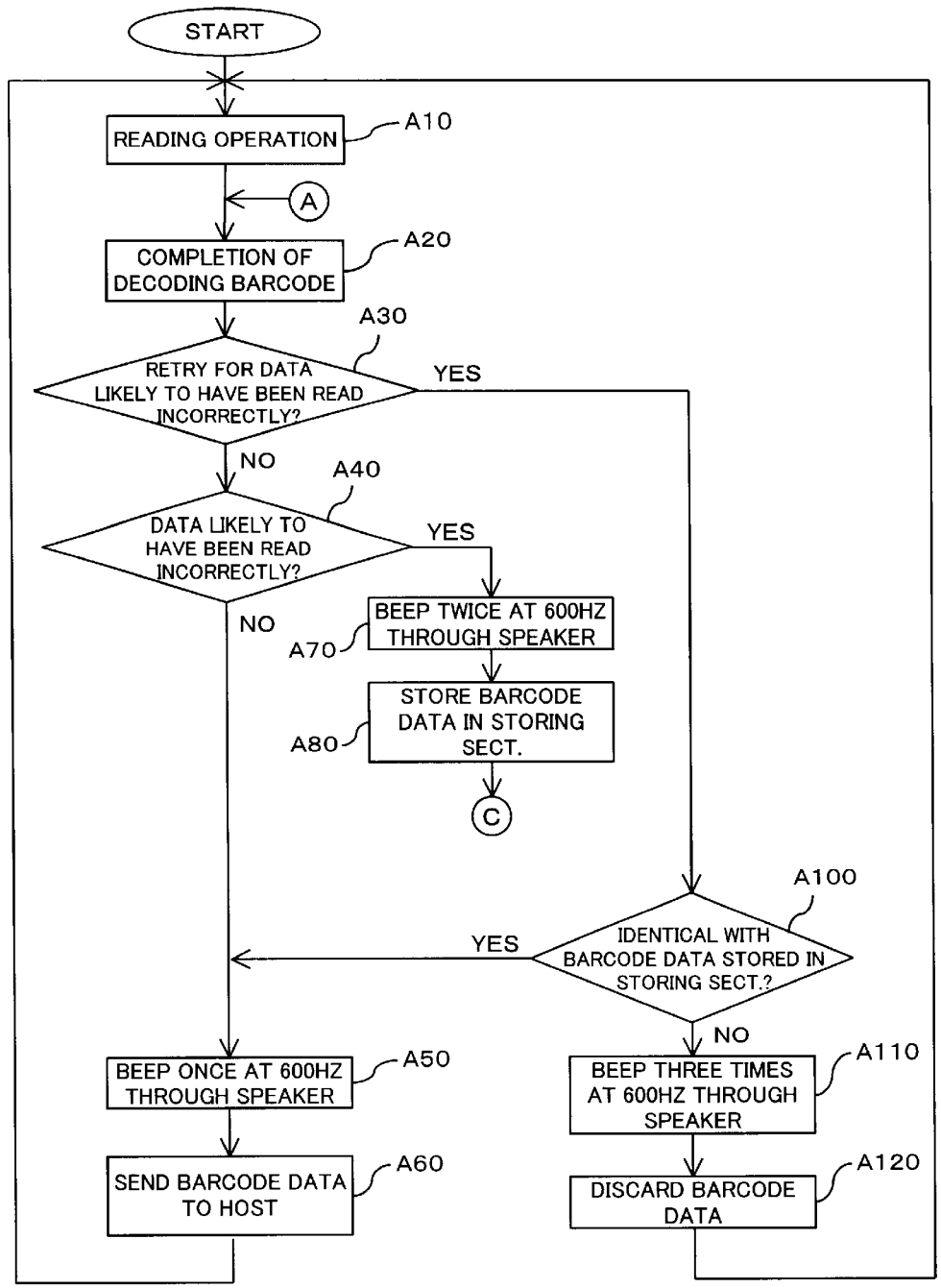
FIGS. 4(A) and 4(B) are flow diagrams overall illustrating a barcode reading method according to the first embodiment.
Figure 4B:
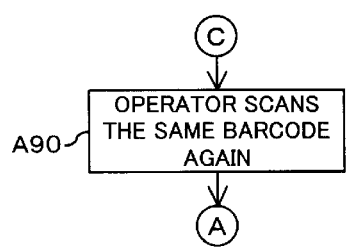

A succession of procedural steps (Steps A10 to A120) for reading of a barcode performed by the elements mentioned above according to the first embodiment will be described with reference to flow diagrams FIGS. 4(A) and 4(B).

First of all, an operator reads a barcode with barcode reader 10 (Step A10) and then decoder 15 decodes the result of the reading of the barcode (Step A20).

CPU 60 discriminates whether or not the data (the result of the reading) currently being processed is the result of re-reading (retrying) for the barcode (Step A30). If the data is not a result of re-reading (No route in Step A30), reading incorrectness discriminating section 20 discriminates whether or not the result of the reading of the barcode by barcode reader 10 is likely to be incorrect (Step A40).

When reading incorrectness discriminating section 20 judges that the result of the reading is likely to be correct (No route in Step A40),CPU 60 makes speaker 30 beep once at 600 HZ (Step A50) and treats the result of the reading of the barcode accordingly. For example, when the barcode reading apparatus of the first embodiment is incorporated in a POS system, CPU 60 makes arrangements for paying or sends the result of the reading to the host computer through host I/F section 70 (Step A60). The procedural steps return to Step A10 for future reading of another barcode.

On the other hand, if the result of the reading by barcode reader 10 is discriminated likely to be incorrect (Yes route in Step A40), CPU 60 makes speaker 30 beep twice at 600 HZ so as to indicate to the operator that it is necessary to re-read the barcode as a re-read indication (Step A70) and stores the result of the reading of the barcode in storing section 40 (Step A80).

The operator re-reads (retries for) the barcode (Step A90) in response to the re-read indication through speaker 30 and the procedural steps return to Step A20.

If the data (the result of the reading) currently processed is a result of re-reading for the same barcode (Yes route in Step A30), comparing section 50 compares the data of the result of the reading with the result of reading for the same barcode stored in storing section 40 (Step A100). When comparing section 50 determines the results of the reading currently processed and stored in storing section 40 to be identical (Yes route in Step A100), CPU 60 determines that the reading of the barcode has succeeded so that the procedural steps proceed to Step A50.

On the other hand, when comparing section 50 determines that the result of the reading currently being processed is different from that stored in storing section 40 (No route in Step A100), CPU 60 determines that the reading of the barcode has failed, makes speaker 30 beep three times at 600 HZ (Step A110) and discards the result of reading of the barcode stored in storing section 40 (Step A120). Then the procedural steps return to Step A10 for the following reading of a barcode.

When reading incorrectness discriminating section 20 discriminates that a result of reading of a barcode is likely to be incorrect in the barcode reading apparatus of the first embodiment, the operator re-reads the barcode using barcode reader 10. Therefore, the barcode can be re-read in a varied state (e.g., the posture of a barcode in relation to the barcode reader of the barcode reading apparatus) for reading whereupon the possibility that the result of reading of the barcode by barcode reader 10 is likely to be incorrect can be reduced.

Partly since it is possible for the operator to recognize a result of barcode reading by barcode reader 10 as likely to be incorrect, and partly since the operator understands whether or not barcode reading information is correct visually, it is possible to boost the reliability of reading barcodes.

Further, a reading result discriminated likely to be incorrect by reading incorrectness discriminating section 20 is stored in storing section 40 and comparing section 50 compares the result of re-reading of the barcode by barcode reader 10 in response to an indication through speaker 30 with the result of the reading stored in storing section 40 to judge whether or not the results of the reading and the re-reading are identical. If the results are discriminated not to be identical by comparing section 50, CPU 60 determines that the barcode reading has failed to treat the result of the reading accordingly. For this reason, since the operator can easily grasp that the barcode reading has failed, it is possible to further improve the reliability of results of barcode reading.

Conversely, if the results of the reading and the re-reading are discriminated to be identical by comparing section 50, CPU 60 determines that the reading of the barcode has succeeded in treating the result of the reading accordingly. Therefore the operator can recognize successful barcode reading with ease.

Speaker 30 indicates a discrimination result by comparing section 50 to the operator whereupon the operator can grasp the result of discrimination by comparing section 50. It is therefore possible for the operator to understand whether barcode reading has succeeded or failed so that the operator can respond immediately to the indication.

For example, when speaker 30 indicates to the operator (by beeping three times at 600 HZ) that comparing section 50 has judged results of reading and re-reading not to be identical, the operator can understand that the reading of the barcode has failed and take an appropriate action, such as directly inputting information about the article, whose barcode is read incorrectly, without using barcode reader 10.

If the result of decoding in a predetermined scanning direction with respect to a result of reading of a barcode by barcode reader 10 is incorrect while the result of decoding in the reverse direction of the scanning direction is correct, reading incorrectness discriminating section 20 discriminates that the result of the reading is likely to be incorrect. Thereby it is possible to easily and accuracy discriminate whether or not a reading result is likely to be incorrect.

Further, if an amount of a distortion (e.g., a ratio of the widths of thick and thin bars) obtained from the result of decoding of a result of barcode reading by barcode reader 10 is outside the predetermined range (e.g., less than 2.2) of an amount of a distortion previously established while the result of the decoding for the result of the reading, reading incorrectness discriminating section 2 discriminates the result of the reading likely to be incorrect whereupon the result of the reading is definitely discriminated to be incorrect or not with ease.

Still further, speaker 30 notifies the operator that a result of reading of a barcode is likely to be incorrect as a re-read indication (by beeping twice at 600 HZ). With this function, since an operator can definitely understand whether or not reading of a barcode currently being processed has succeeded when re-reading the barcode, it is possible to prevent the result of an incorrect barcode reading from being used, thereby enhancing reliability.

(B) Second Embodiment

A barcode reading apparatus according to a second embodiment is used to read data in the form of a barcode in the same manner as that of the first embodiment, and is identical in configuration with that of FIG. 1. In the second embodiment, ways of indicating that it is necessary to re-read a barcode via speaker 30 and for discrimination performed by CPU 60 are different from those performed in the barcode reading apparatus of the first embodiment.

When reading of a barcode and re-reading of the same barcode are continuously judged to be identical a predetermined number of times (e.g., five times) by comparing section 50, CPU (processing section) 60 determines that the reading of the barcode has succeeded in treating the result accordingly. On the other hand, when the results of the reading and the re-reading are judged not to be identical by comparing section 50 prior to being continuously discriminated to be identical the predetermined number of times (e.g., five times), CPU 60 determines that the reading of the barcode has failed to treat the result accordingly.

Speaker 30 in the barcode reading apparatus of the second embodiment beeps an arbitrary number of times at various frequencies (e.g., 600 HZ and 1200 HZ, two kinds of frequencies in the illustrated embodiment) in the same manner as that of the first embodiment. Control by reading incorrectness discrimination section 20 and/or CPU 60 makes speaker 30 beep for a predetermined length of time at predetermined intervals.

In the second embodiment, speaker 30 beeps once at 1200 HZ when comparing section 50 judges that the results of reading and re-reading of the same barcode to be identical.

Figure 5:
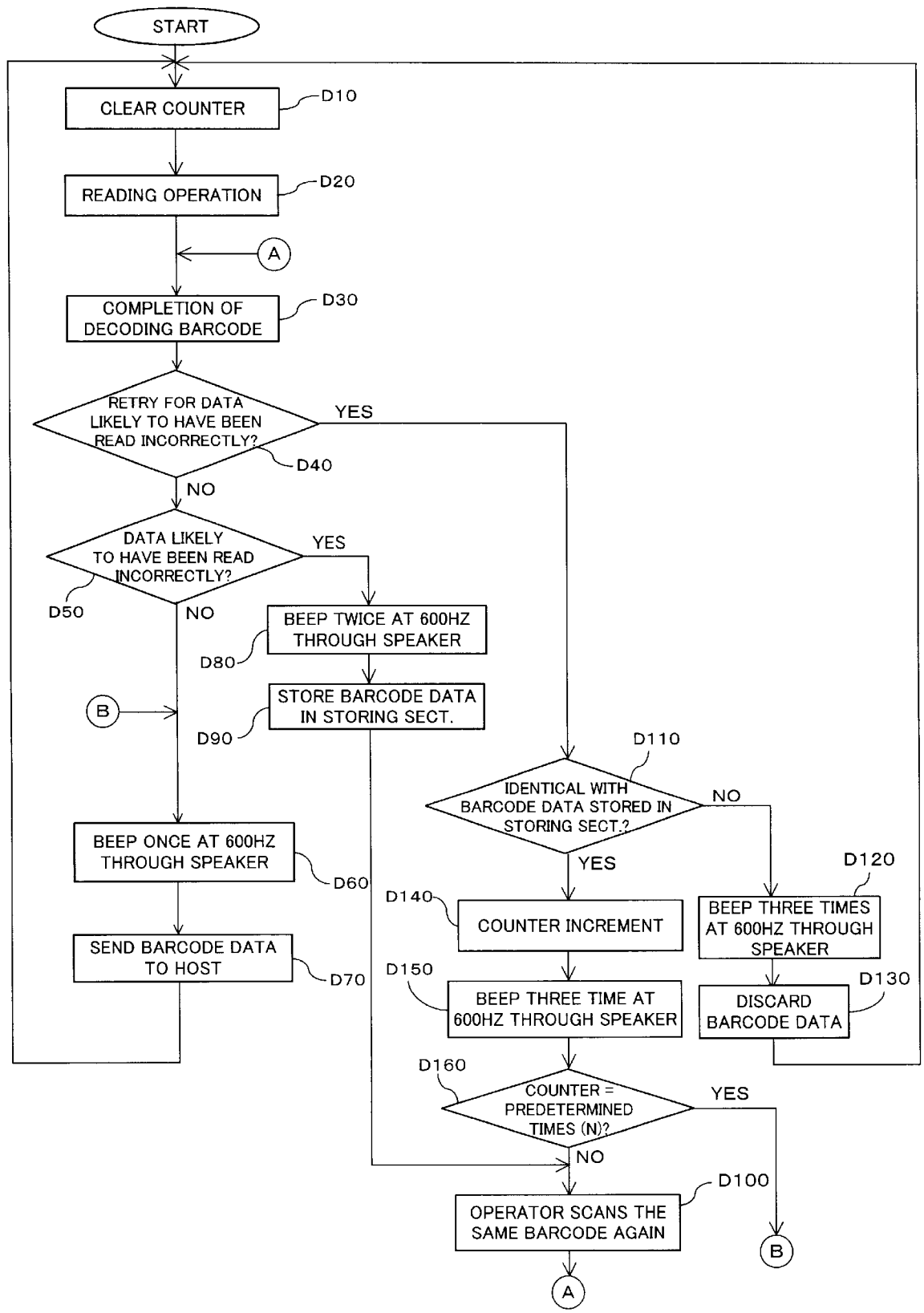
FIG. 5 is a flow diagram illustrating a barcode reading method according to a second embodiment.

A succession of the procedural steps (Steps D10 through D160) for reading a barcode performed in the barcode reading apparatus, as the second embodiment, having above-mentioned elements, will be described with reference to FIG. 5.

First of all, reading incorrectness discriminating section 20 clears a flag that is to be set when a barcode reading result is likely to be incorrect (Step D10) and the operator reads a barcode with barcode reader 10 (Step D20). The result of the barcode reading is decoded by decoder 15 (Step D30).

CPU 60 discriminates whether or not the data (the result of the reading) currently being processed is a result of re-reading (retrying) for the barcode (Step D40). If the data is not a result of re-reading (No route in Step D40), reading incorrectness discriminating section 20 judges whether or not the result of the reading of the barcode by barcode reader 10 is likely to be incorrect (Step D50).

When reading incorrectness discrimination section 20 discriminates that the result of the reading is likely to be correct (No route in Step D50), CPU 60 makes speaker 30 beep once at 600 HZ (Step D60) and treats the result of the reading of the barcode accordingly.

For example, when the barcode reading apparatus of the second embodiment is incorporated in a POS system, CPU 60 makes arrangements for paying or sends the result of the reading to the host computer through host I/F section 70 (Step D70) in accordance with the result of the reading. The procedural steps return to Step D10 to read an ensuring.

On the other hand, if the result of the reading by barcode reader 10 is judged likely to be incorrect (Yes route in Step D50), CPU 60 makes speaker 30 beep twice at 600 HZ as a re-read indication so as to indicate to the operator that it is necessary to re-read the barcode (Step D80) and stores the result of the reading of the barcode in storing section 40 (Step D90).

In response to the re-read indication, the operator re-reads the barcode (Step D100) and then the procedural steps return to Step D30.

If the data (the result of the reading of a barcode) currently being processed is a result of re-reading of the same barcode (Yes route in Step D40) comparing section 50 compares the result of the reading currently being processed with the result of reading for the same barcode stored in storing section 40 (Step D110).

When comparing section 50 discriminates that the data currently being processed is identical with the result of the reading stored in storing section 40 (Yes route in Step D110), CPU 60 increments the value of a counter (Step D140), makes speaker 30 beep once at 1200 HZ (Step D150) and judges whether or not the value of the counter is identical to a predetermined number N of times (e.g., N=5) (Step D160).

When the value of the counter is discriminated not to be identical to the predetermined number N of times (No route in Step D160), CPU 60 causes the procedural steps to proceed to Step D100. When the value is discriminated to be identical to the predetermined times N (Yes route in Step D160), CPU 60 determines that the reading of the barcode has succeeded and causes the procedural steps to proceed to Step D60.

On the other hand, when comparing section 50 judges that the result of the reading currently being processed is not identical to the result of the reading stored in storing section 40 (No route in Step D110) CPU 60 determines that the reading of the barcode has failed whereupon CPU 60 makes speaker 30 beep three times at 600 HZ (Step D120) and discards the result of the reading stored in storing section 40 (Step D130). Then the procedural steps return to Step D10 to read the ensuing barcode.

As mentioned above, the barcode reading apparatus of the second embodiment guarantees the same advantageous results as the first embodiment, and additionally since CPU 60 determines that reading of a barcode has succeeded in treating the result of the reading accordingly when comparing section 50 continuously discriminates the result of the last re-reading and the first reading stored in storing section 40 of the same barcode to be identical a predetermined number of times (e.g., five times). It is therefore possible to apply a higher criterion to discriminate whether or not a barcode reading result is likely to be incorrect with further improved reliability.

Comparing section 50 may repeatedly compare a result of re-reading of a barcode with a result of reading of the same barcode until the results of the reading and the last re-reading are continuously judged to be identical an arbitrary number (a predetermined number) of times. Increasing and decreasing the predetermined number can vary the degree of the criterion to judge whether or not a barcode reading result is likely to be incorrect. Namely, increasing the predetermined number of times results in elevating the criterion to discriminate whether or not a result of reading of a barcode is likely to be incorrect; and decreasing the predetermined number of times results in debasing the criterion.

When comparing section 50 discriminates that the results of the first reading and the last re-reading of a barcode are not to be identical, and then subsequently discriminates them to be identical the predetermined number of times (e.g., five times), the result of the reading of the barcode is determined to have failed. As a result, it is further possible to improve the reliability of determination whether or not barcode reading has succeeded.

Further, since speaker 30 of the illustrated embodiment beeps once at 1200 HZ when comparing section 50 discriminates that results of reading and re-reading to be identical, it is possible for the operator to recognize that comparing section 50 discriminates that the results of reading and re-reading are identical with ease.

(C) Others

The present invention should by no means be limited to the embodiments mentioned above, and various changes or modifications may be suggested without departing from the gist of the invention.

Barcode reader 10 of the foregoing embodiments including laser irradiating section 11 and laser receiving section 12 should by no means be limited to such components. Alternatively, an LED may be used to irradiate and read barcodes, or barcode reader 10 may include a CCD camera. Further, reading of barcodes may be performed by techniques other than optical systems.

Various indications to the operator are carried out through speaker 30, buty these means should not be limited to sound only. Alternatively, the indications may be notified to the operator by lighting an LED or by displaying a message containing information of the indications on a monitor.

The indications through speaker 30 should by no means be limited to the number of beeps and the frequencies mentioned in the foregoing embodiments, and may alternatively be performed by voice.

The manner of discriminating whether or not a result of barcode reading is likely to be incorrect can be varied and modified, for example, the discrimination is performed based on contrast between white and black bars.

Those skilled in the art can practice the present invention with reference to the disclosure of the foregoing embodiments.

Industrial Applicability

As mentioned above, a barcode reading apparatus and method of the present invention are preferably used to read a barcode using a barcode reader, and in particular, are further preferably applied to read a barcode in a POS (Point Of Sales) system.

What is claimed is:

1. A barcode reading apparatus comprising:
    a barcode reader for reading a barcode;
    a reading incorrectness discriminating section for discriminating whether or not a result of the reading of the barcode by said barcode reader is likely to be incorrect; and
    a reread indicating section for indicating, if the result of the reading of the barcode is discriminated likely to be incorrect by said reading incorrectness discriminating section, that it is necessary to re-read the bar code by said barcode reader,
    wherein, if a result of decoding in a predetermined direction of scanning with respect to the result of reading of the barcode by said barcode reader is incorrect while a result of decoding in a reverse direction of the predetermined direction is correct, said reading incorrectness discriminating section discriminates that the result of the reading is likely to be incorrect.

2. A barcode reading apparatus according to claim 1, further comprising:
    a storing section for storing, if the result of the reading of the barcode is discriminated likely to be incorrect by said reading incorrectness discriminating section, the result of the reading of the barcode therein;
    a comparing section for comparing the result of the re-reading of the barcode by said barcode reader in response to the indicating by said re-read indicating section with the result of the reading stored in said storing section to discriminate whether or not the results of the reading and the re-reading are identical;
    a processing section for determining, if the result of the reading and re-reading are discriminated not to be identical by said comparing section, the reading of the barcode has failed to treat the result of the reading accordingly.

3. A barcode reading apparatus according to claim 2, wherein, if the results of the reading and the re-reading are discriminated to be identical by said comparing section (50), said processing section (60) determines the reading of the barcode has succeeded to treat the result of the reading accordingly.

4. A barcode reading apparatus according to claim 2, wherein
    said re-read indicating section (30) is operable to repeatedly perform the indicating such that said barcode reader (10) repeatedly re-reads the barcode until the result of the reading and the result of the last re-reading are continuously discriminated to be identical a predetermined number of times; and
    if the results of the reading and the last re-reading are continuously discriminated to be identical the predetermined number of times by said comparing section (50),
    said processing section (60) determines the reading of the barcode has succeeded to treat the result of the reading accordingly.

5. A barcode reading apparatus according to claim 4, wherein, if the results of the reading and the last re-reading are discriminated not to be identical prior to being continuously discriminated to be identical the predetermined number of times, said processing section determines the reading of the barcode has failed to treat the result of the reading accordingly.

6. A barcode reading apparatus according to claim 2, 3, 4, or 5, further comprising a discriminating result indicating section (30) for indicating the result of the each discriminating performed by said comparing section (50).

7. A barcode reading apparatus according to claim 2, 3, 4, 5, or 1 wherein said reading incorrectness discriminating section compares the result of the reading of the barcode by said barcode reader with barcode composition requirement previously established to determine whether or not the result of the reading suffices said barcode composition requirement and, if the result of the reading is discriminated not to suffice said barcode composition requirement, reading incorrectness discriminating section discriminates the result of the reading is likely to be incorrect.

8. A barcode reading apparatus according to claim 2, 3, 4, 5, or 1 wherein, if an amount of a distortion of reading obtained from the result of the reading of the barcode by said barcode reader is outside a predetermined range of a distortion of reading while a result of decoding with respect to the result of the reading of the barcode is correct, said reading incorrectness discriminating section discriminates the result of the reading is likely to be incorrect.

9. A barcode reading method comprising the steps of:
    reading a barcode;
    discriminating whether or not the result of said reading of the barcode is likely to be incorrect; and
    if the result of said reading is discriminated likely to be incorrect,
    indicating to an operator that it is necessary to re-read the barcode, wherein
    said step of discriminating for reading correctness includes the step of:
    if a result of decoding in a predetermined direction of scanning with respect to the result of said reading of the barcode is incorrect while a result of decoding in a reverse direction of the predetermined direction is correct,
    discriminating said reading is likely to be incorrect.

10. A barcode reading method according to claim 9, further comprising the steps of:
    if the result of said reading is discriminated likely to be incorrect,
    storing the result of said reading of the barcode in the storing section;
    re-reading the barcode in response to said indicating in said step of indicating;
    comparing the result of said re-reading of the barcode with the result of said reading of the barcode stored in the storing section to discriminate whether or not the results of said re-reading and said reading are identical; and
    if the result of said re-reading and said reading are discriminated not to be identical,
    determining said reading of the barcode has failed to treat the result of said reading accordingly.

11. A barcode reading method according to claim 10, further comprising the step of:

if the result of said re-reading and said reading are discriminated to be identical, determining said reading of the barcode has succeeded and treating the result of said reading accordingly.

12. A barcode reading method according to claim 10, further comprising the steps of:

repeatedly performing said step of indicating, said step of re-reading, and said step of comparing until the results of said last re-reading and said reading are continuously discriminated to be identical a predetermined number of times;

if the results of said last re-reading and said reading are continuously discriminated to be identical the predetermined number of times, determining said reading of the barcode has succeeded to treat the result of said reading accordingly.

* * * * *